Dec. 16, 1947.  M. R. HATCH ET AL  2,432,886
PRESS
Filed May 5, 1943  4 Sheets-Sheet 1

INVENTORS.
MEREDITH R. HATCH,
WILLIAM B. SAUL, & HARRY Y. O'CONNOR.
BY Fay, Gorlick, Chilton & Isler.
attorneys.

Dec. 16, 1947.   M. R. HATCH ET AL   2,432,886
PRESS
Filed May 5, 1943   4 Sheets-Sheet 2

INVENTORS.
MEREDITH R. HATCH,
WILLIAM B. SAUL & HARRY V. O'CONNOR
BY Fay, Gohrick, Chilton & Isler.
Attorneys.

INVENTORS.
MEREDITH R. HATCH,
WILLIAM B. SAUL & HARRY V. O'CONNOR
BY Fay, Gorlick, Chilton & Isler
Attorneys.

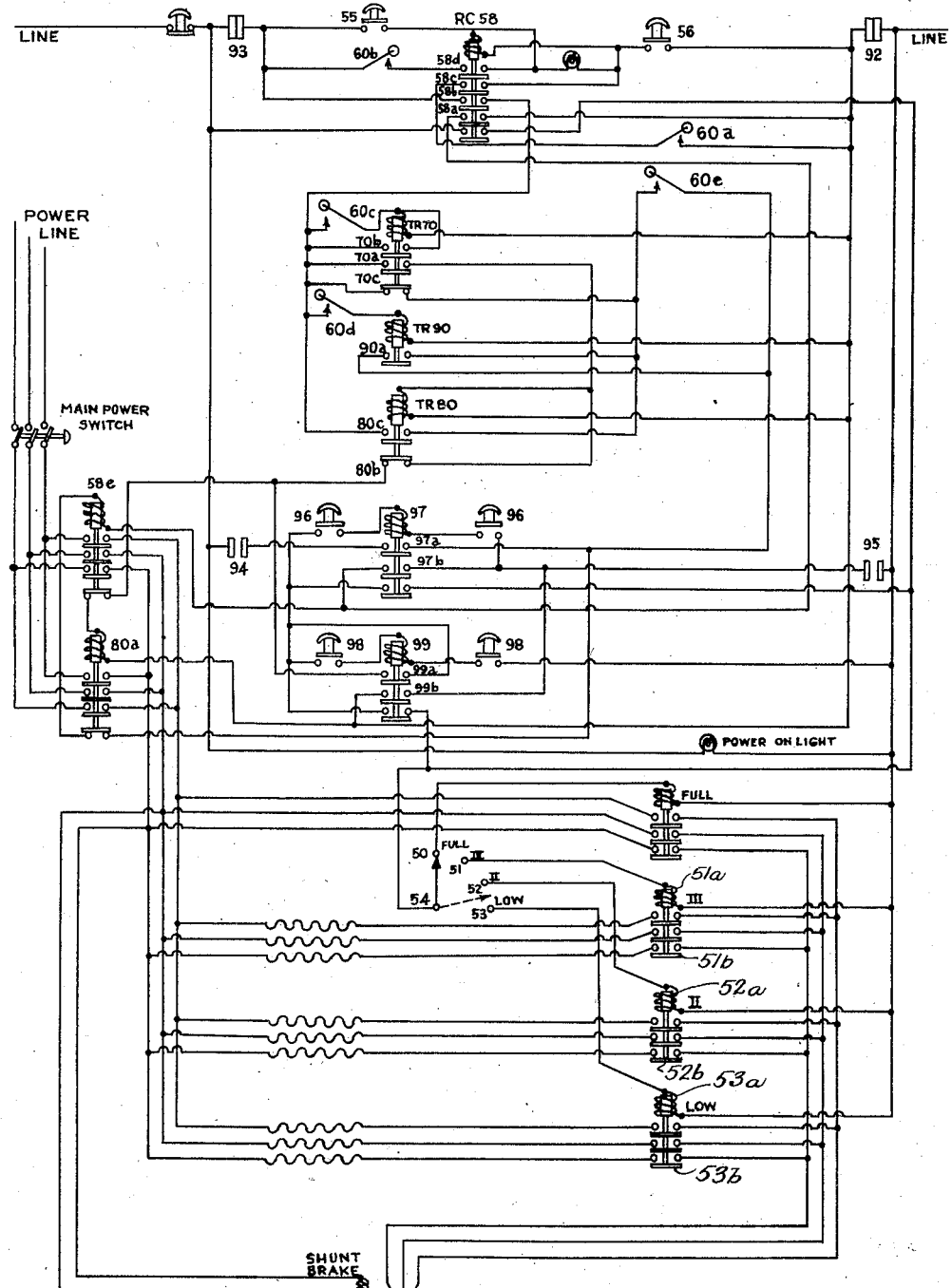

Patented Dec. 16, 1947

2,432,886

UNITED STATES PATENT OFFICE 2,432,886

PRESS

Meredith R. Hatch, William B. Saul, and Harry V. O'Connor, Toledo, Ohio, assignors to E. W. Bliss Company, Brooklyn, N. Y., a corporation of Delaware Application May 5, 1943, Serial No. 485,692

4 Claims. (Cl. 18—16)

This invention relates, as indicated, to presses, but has reference more particularly to a press which is especially adapted for plastic molding.

In the molding of plastic articles by means of presses, it is desirable that the molding be accomplished in a series of operations or steps, which may be briefly described as follows:

(1) The plunger of the press is first moved downwardly to a predetermined elevation which produces a desired predetermined pressure on the molding powder or mix, this pressure being maintained for a predetermined period, during which the mold contents are subjected to a preliminary heating.

(2) The plunger is then momentarily elevated to permit gassing or ventilating of the mold and contents.

(3) The plunger is then lowered to a position in which the mold is closed, and is maintained in this position for a predetermined number of seconds, during which the molding or curing operation is completed.

(4) The plunger is again elevated to expose the molded plastic article for removal from the mold.

The pressure and time intervals utilized for the various operations will depend upon the balance of the mold mix, under changing weather conditions, and also upon slight variations in the properties of the mix, and must therefore be subject to a substantially accurate control by the operator.

While such control can readily be obtained by the use of hydraulically-operated presses, the production operation thereof is slow comparatively and the means for hydraulically operating such presses is not always available, and moreover, the cost of such presses is sometimes prohibitive for the manufacture of certain types of plastic products, the cost of which must be maintained between critical limits.

The present invention, accordingly, has as its primary object the provision of a mechanically driven press in which the aforesaid operations, and in particular operations involving variable pressures, may be performed in a relatively rapid manner.

Another object of the invention is to provide a press in which pressures equivalent to those obtainable in a hydraulic press, are developable mechanically.

Another object of the invention is to provide a press for the purpose set forth which is constructed to withstand relatively high pressures and which may be varied in intensity and duration.

A further object of the present invention is the provision of a molding press which may be driven directly by an electric motor as distinguished from a motor and hydraulic pump drive, thereby providing a plastic press which can be utilized as a complete production unit without dependence upon auxiliary equipment, such as pressure accumulators, pipe lines and the like incident to the use of hydraulic presses.

A further object of the invention is to provide a press of the character referred to which is motor-driven, and in which novel electrical circuits and controls are employed in connection with such motor to actuate the press.

A still further object of the invention is to provide a press of the character referred to having novel means for lubricating selected parts of the press.

Other objects and advantages of the invention will be apparent during the course of the following description.

In the accompanying drawings, forming part of this specification, and in which like numerals are employed to designate like parts throughout the same, we show a press structure embodying the features of our invention.

Fig. 4 is a control and power circuit diagram for the press.

Figure 1:
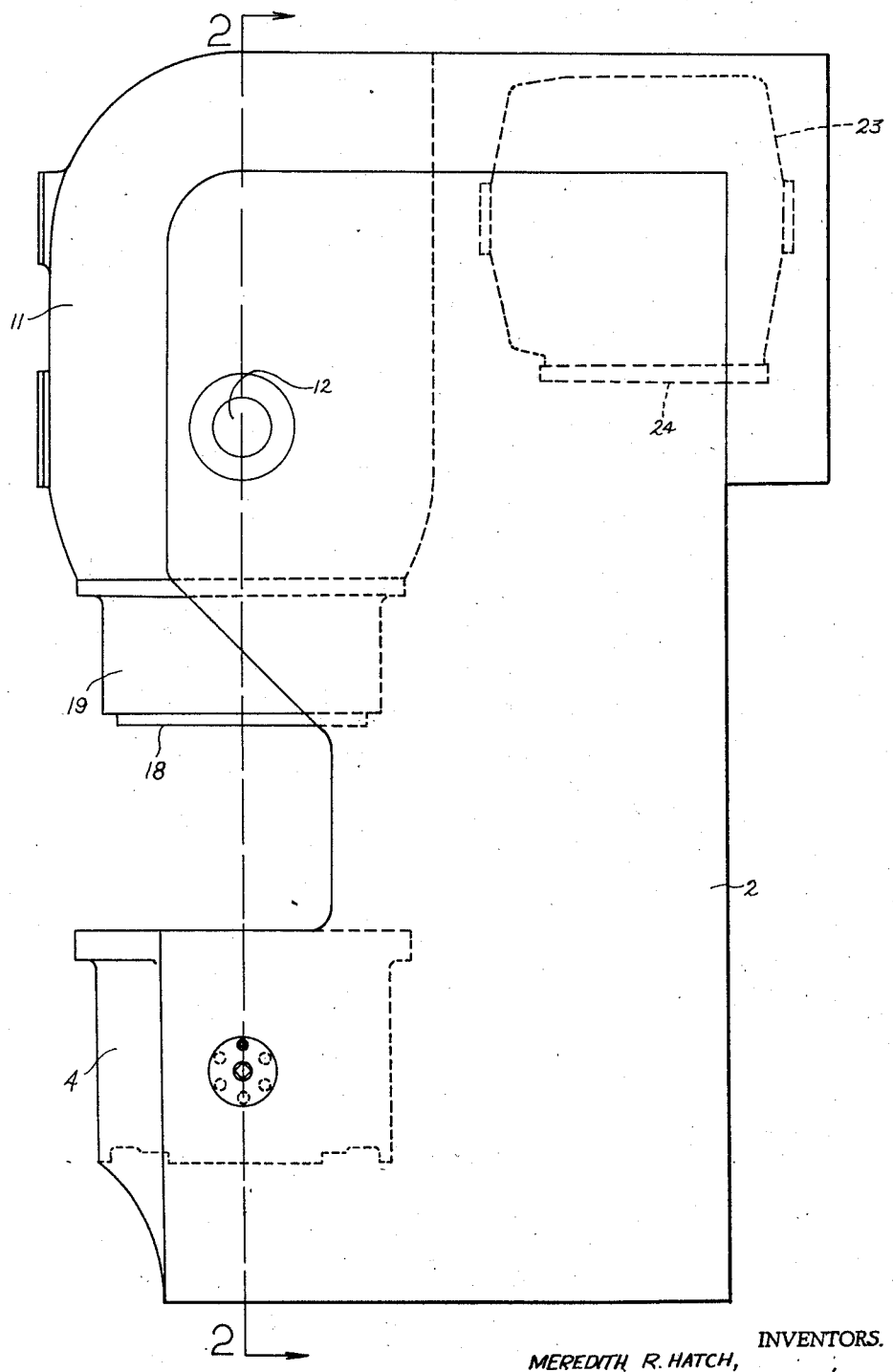
Fig. 1 is a side elevational view of such a press.
Figure 2:
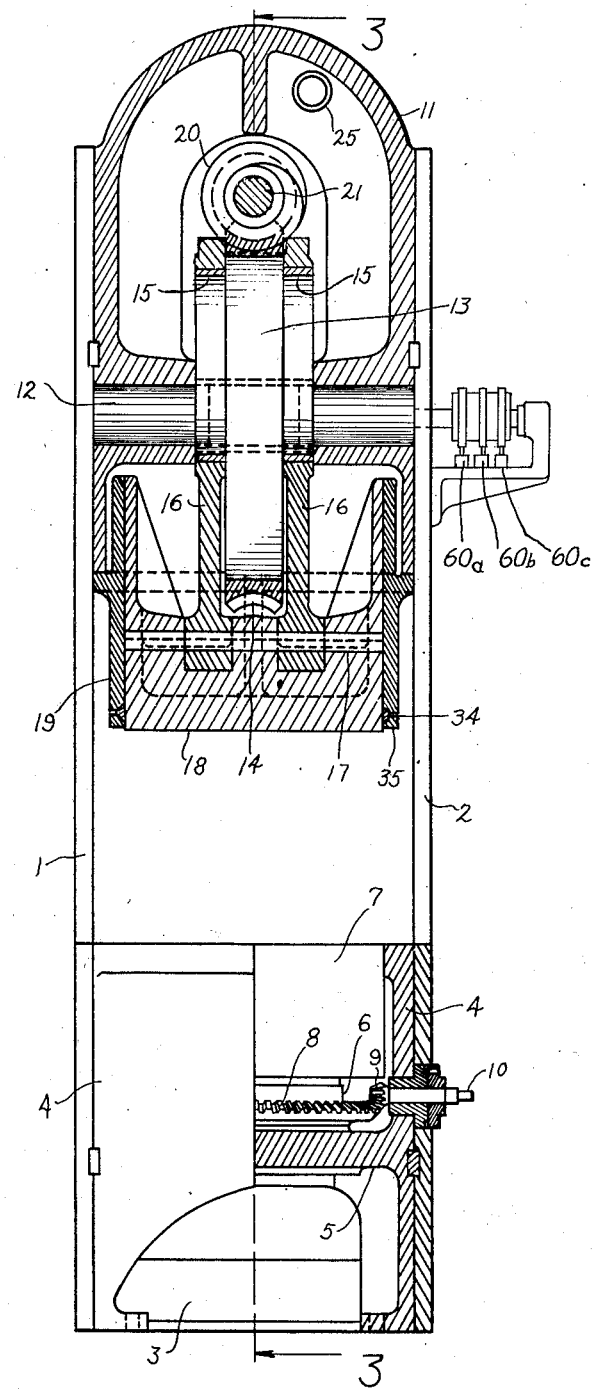
Fig. 2 is a view, partly in elevation and partly in section, taken on the line 2—2 of Fig. 1.

For the purpose of properly understanding the invention, the press and its construction will first be described, followed by a description of the control and power circuits for the press.

The press will be seen to comprise a pair of spaced plates 1 and 2 of substantial cross-section and connected together at their lower rear corners by a spacer 3, and at their lower front portions by a bed 4.

The bed 4 has a transverse web or base formation 5 which serves as a pedestal and bearing for an adjusting screw 6 mounted to rotate about a vertical axis, and having threadingly mounted thereon the bolster 7 of the press. The bolster 7 is adjustable vertically, feathered, or slidably keyed to member 4 to prevent rotation thereof. The bolster may be vertically adjusted by rotation of the screw 6, and for the purpose of rotating the screw, a bevel gear 8 is keyed thereto, and is engaged by a bevel pinion 9, suitably journalled in the bed and in side plate 2. A squared end 10 of the stub shaft of gear 9, is engageable by means of a hand crank (not shown). The bevel gear 8 is supported by the web 5 of the bed, and in turn serves to support the screw 6.

Connecting the side plates 1 and 2 above the bed 4 is a crown or head structure 11 having a transversely extending main shaft 12 mounted therein, and upon which are rotatably mounted spaced eccentrics 13, having removably and non-rotatably secured to the eccentric structure a worm wheel 14 which is coaxial with shaft 12.

Rotatably mounted on the spaced eccentrics 13 are bushings 15 upon which are rotatably mounted connecting arms or links 16, the latter being connected at their lower ends, as by means of a wrist pin 17, to a plunger 18.

The plunger 18 is reciprocably slidable or movable through a sleeve 19, which is secured in any suitable manner to the lower end of the crown or head structure 11.

Figure 3:
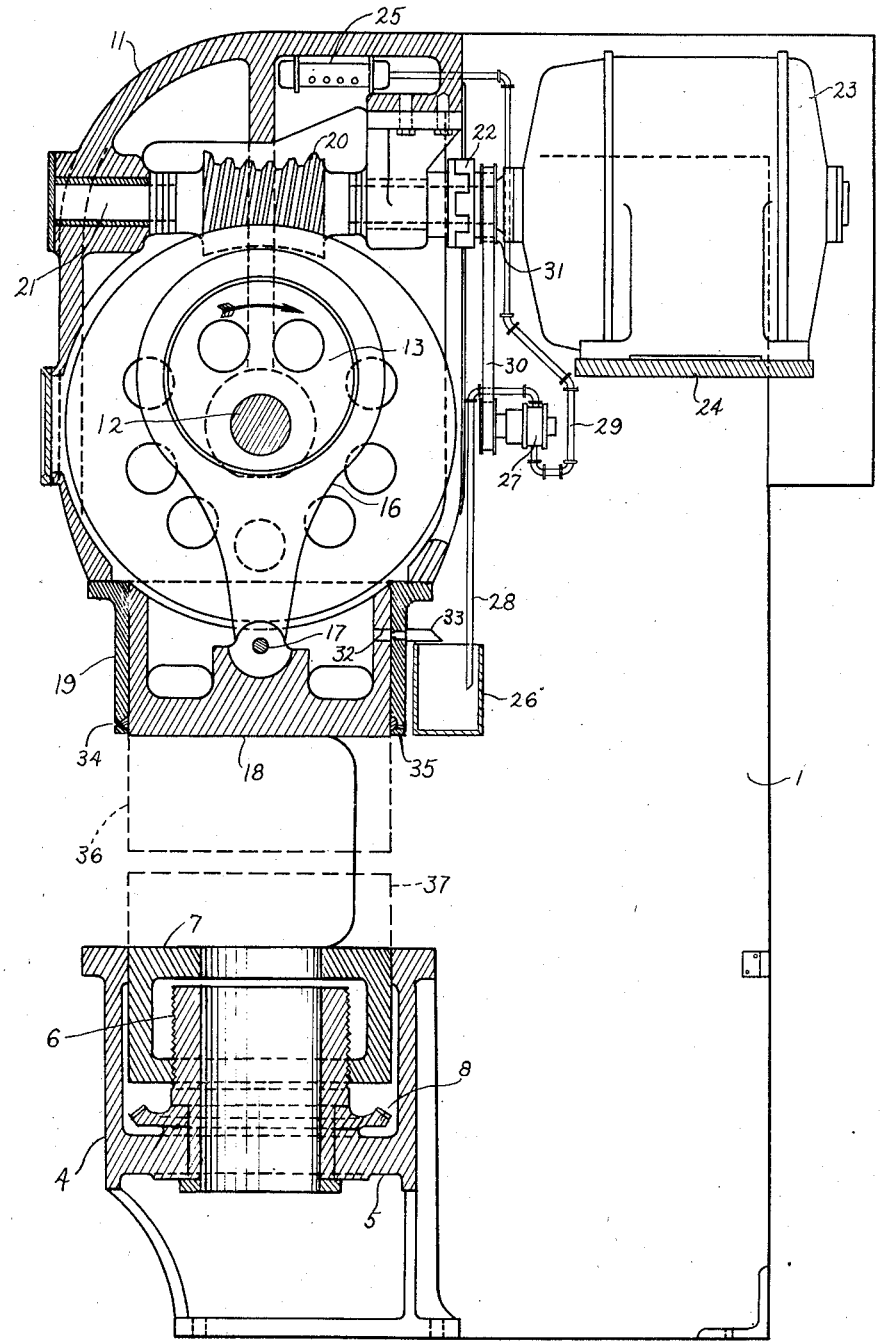
Fig. 3 is a cross-sectional view of the press, taken on the line 3—3 of Fig. 2.

For the purpose of driving the eccentric 13 and thereby reciprocating the plunger 18, the worm wheel 14 has in driving engagement therewith a worm 20, which, as clearly shown in Fig. 3, is so contoured as to have substantially its entire length in contact with the teeth of the wheel 14. The advantage of such a driving connection will be presently described.

The worm is keyed to a shaft 21, which is suitably double journalled in the upper portion of the crown, and is driven, through the intermediary of a flexible coupling 22, by a motor 23 which is mounted on a plate 24 supported by the side plates 1 and 2.

It will be noted that the frame structure described is such that the crown or head can be of a self-enclosing unitary formation with closure plates for lubricant retention.

For the purpose of lubricating the parts of the press within the crown 11, an oiler manifold 25 is provided, which is supported within the upper end of the crown, and to which oil is supplied from a sump 26 by means of a pump 27, through conduits 28 and 29. The pump 27 is driven by the shaft 21 through an endless belt 30, the belt being driven through an over-running clutch 31, so that the oil is fed upwardly only. The oil which drains into the hollow plunger 18 flows through an opening 32 in the plunger and through a spout 33 into the sump 26. Leakage of oil between the plunger 18 and sleeve 19 is prevented by a ring gasket 34, adjustably maintained in contact with the plunger by a retainer ring 35, which is bolted or otherwise adjustably secured to the lower end of the sleeve 19.

It will be understood that for plastic molding the bolster and plunger have mounted thereon molds or dies, diagrammatically indicated at 36 and 37 in Fig. 3, and that the molding operations involve movement of the die 36 into coacting relationship with the die 37.

For the operation of the aforesaid press, in a manner analogous to the operation of a hydraulic press, the motor 23 is preferably a stall torque motor having special electrical characteristics and primarily to exert the maximum required torque in a stalled condition over a maximum predetermined period of mold operating time without being destroyed. The stator functions as a primary and the rotor as the secondary, the difference between such a motor and the ordinary motor residing in the fact that the rotor while acting as a secondary, is so constructed that when the motor is stalled, and the resulting heat generated (due to short circuiting of the secondary), the rotor has the capacity to dissipate the heat for a practical molding period of time before there is any heat damage to the insulation, the torque being, at the same time, maintained.

The motor, moreover, is designed particularly to produce four different degrees of pressure, depending upon the percentage desired of the full torque developed by the motor. These are in the particular press disclosed preferably as follows:

Full Pressure=100% Torque
Third Pressure=70% Torque
Second Pressure=50% Torque
Low Pressure=20% Torque In order to vary the mechanical pressure in accordance with the aforesaid table, four different settings are provided in the power lines and voltage controls to the motor, these settings being indicated in Fig. 4 by the reference numerals 50, 51, 52 and 53, respectively.

If it be assumed that the full pressure of the press is to be utilized for a molding cycle, the selector switch 54 will first be set, as shown in Fig. 4, the plunger 18 of the press having first been elevated to its starting position. The operator will then operate the manual push button controls 55 and 56 thereby starting a cycle of operations, which will involve the following steps in automatic sequence:

When 55 and 56 are pushed in the relay coil 58 is energized closing contacts 58$^a$ and 58$^b$ and also contacts 58$^c$ and 58$^d$. This establishes the forward motion motor circuit.

A rotary switch 60 has a series of contacts 60$^a$, 60$^b$, 60$^c$ and other contacts to be described. The contacts 60$^a$ and 60$^b$ are such as to be closed and remain closed throughout the press cycle, and 60$^c$ is such as to close when the material is reached by the die. Contact 60$^c$ serves to maintain the circuit closed until the timer relay 70 takes over at which point the cold material has been compressed and the motor has stalled and the material is being subjected to heat and pressure. The extent of this downward movement of the slide may be varied by the setting of the contact switch 60$^c$. The stalled or torque dwelling period duration of the motor at this stage may be determined by the setting of the timer relay 70.

The relay coil 58 remains energized until the reversing of the motor takes place, which will now be described.

At the end of the predetermined preliminary heating and pressure period timer relay 70 closes the contacts 70$^a$ and establishes a circuit to energize a timer relay 80, and also a motor reversing contactor coil 80$^a$ which acts to establish a reverse circuit for the motor. Contact 70$^c$, controlled by timer relay coil 70, opens the forward motor control circuit 58$^d$. This arrangement is such that 70$^c$ opens before 70$^a$ closes. The motor drives the worm gear backward until the die is raised a sufficient distance and during a required period to gas the mold. This raising period is determined by the setting of the timer relay 80. At the end of the raising period contacts 80$^b$ open and break the circuit to the contactor coil 80$^a$ and close contacts 80$^c$ which again establishes a circuit to energize contactor coil 58$^e$ and the forward drive circuit of the motor. The motor is reversed, thus to forward drive which continues until the material in the mold is again being subjected to heat and pressure and until the slide and die carried thereby have reached the end of the downward stroke and the motor is then stopped automatically, as distinguished from being stalled, by the opening of the motor circuit.

This opening of the motor circuit is effected in the following manner:

Contacts 60ᵈ on rotary switch 60 are closed and the timer relay 90 is energized. Limit switch 60ᵉ on the rotary switch 60 has opened and circuit to 58ᵉ has been broken.

Timer relay 90 is set to the desired curing time or die dwell and closes contacts 90ᵃ at the end of the curing period, thus establishing the circuit 58ᵉ and the motor circuit is thus closed or reestablished. The motor then drives the press until the slide is raised to its upmost position and switches 60ᵃ and 60ᵇ are opened to break the motor circuit which thus stops the motor.

The circuit functioning above described was for a full torque-pressure capacity of the motor through contacts 54—50. Should lighter pressures be desired the voltage control can be set to 54—51 or 54—52 or 54—53 as desired to include more resistance in the motor lines. Coils 51ᵃ, 52ᵃ or 53ᵃ serve in the respective lines to close switches 51ᵇ, 52ᵇ or 53ᵇ respectively, to obtain the proper resistance hook-ups in the motor line.

An inching control is shown in the diagram Fig. 4 comprising selector switches 92 and 93 and 94 and 95 for forward and reverse movement respectively of the slide. The forward button switches 96 are maintained normally open by a spring and are held closed by manual effect only. When button switches 96 are held closed, relay coil 97 is energized and contacts 97ᵃ and 97ᵇ will be closed and the motor then is energized in a forward direction. The button switches 98, when closed, cause relay coil 99 to be energized and contacts 99ᵃ and 99ᵇ will be closed and the motor then drives in a reverse direction.

Due to the fact that the worm 20 is so contoured as to have substantially its entire length in contact with the teeth of the wheel 14, not only can the degree of torque be increased to a relatively high value without danger of breakage of the worm or worm wheel upon stoppage of the press, but the stalling effect which has been described can be accomplished with less wear of these parts. This gear arrangement also is conductive to the constant transmission of pressure to the mold members when the motor is in a stalled or substantially stalled condition during the preliminary heat and pressure stages of the cycle of operation of the machine. It is to be understood, however, that other forms of gearing might be used but we prefer the type of worm and wheel drive disclosed for the advantages of simplicity and efficiency as well as the locking advantages obtained when the die members are maintained under heat and pressure during the final curing step in the machine cycle.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a press for molding plastic materials; two mold members; electrical drive means for imparting a stroke movement for moving one of said members into and out of cooperating relation with the other of said members; and means for controlling said electrical drive means including, a direction control circuit, which when energized causes movement of said drive means in one direction, a second direction control circuit, which when energized causes movement of said drive means in an opposite direction, a switch in the first mentioned circuit, electrically operated time delay means for opening said switch after a period after said time delay means is energized and for closing said switch upon deenergization of said time delay means, a pair of switches in said second direction control circuit, one of said switches being closed by said time delay means after the latter is energized, a second electrically operated time delay means for opening the other of said pair of switches following a period after said second time delay means in energized, a circuit for establishing the first mentioned direction control circuit around the first mentioned switch, a switch in the last mentioned circuit, the last mentioned switch being closed and opened after said period after energization and upon deenergization respectively of said second time delay means, a circuit for the first mentioned time delay means, a switch in the last mentioned circuit, means for closing the last mentioned switch at a predetermined point in the stroke of said one mold member, and means for establishing a holding circuit around the last mentioned switch.

2. In a press for molding plastic materials; two mold members; electrical drive means for imparting a stroke movement for moving one of said members into and out of cooperating relation with the other of said members; and means for controlling said electrical drive means including, a direction control circuit, which when energized causes movement of said drive means in one direction, a second direction control circuit, which when energized causes movement of said drive means in an opposite direction, a switch in the first mentioned circuit, electrically operated time delay means for opening said switch after a period after said time delay means is energized and for closing said switch upon deenergization of said time delay means, a pair of switches in said second direction control circuit, one of said switches being closed by said time delay means after the latter is energized, a second electrically operated time delay means for opening the other of said pair of switches following a period after said second time delay means is energized, a circuit for establishing the first mentioned direction control circuit around the first mentioned switch, a switch in the last mentioned circuit, the last mentioned switch being closed and opened after said period after energization and upon deenergization respectively of said second time delay means, a circuit for the first mentioned time delay means, a switch in the last mentioned circuit, means for closing the last mentioned switch at a predetermined point in the stroke of said one mold member, means for establishing a holding circuit around the last mentioned switch, a limit switch in one of said direction control circuits, said limit switch being opened at the end of said stroke in which said mold members are in cooperating relation, a holding circuit for establishing said one direction control circuit about said limit switch, the last mentioned holding circuit including a switch, a third electrically operated time delay means for opening the last mentioned switch following a period after energization thereof, and means for energizing said third time delay means substantially at said end of said stroke.

3. In a press for molding plastic materials; two mold members; an electric stall torque motor for imparting a stroke movement for moving one of said members into and out of cooperating relation with the other of said members; and means for controlling said motor including, a direction control circuit, which when energized causes movement of said motor in one direction, a second direction control circuit, which when energized causes movement of said drive means in an opposite direction, a switch in the first mentioned circuit, electrically operated time delay means for opening said switch after a period after said time delay means is energized and for closing said switch upon deenergization of said time delay means, a pair of switches in said second direction control circuit, one of said switches being closed by said time delay means after the latter is energized, a second electrically operated time delay means for opening the other of said pair of switches following a period after said second time delay means is energized, a circuit for establishing the first mentioned direction control circuit around the first mentioned switch, a switch in the last mentioned circuit, the last mentioned switch being closed and opened after said period after energization and upon deenergization, respectively, of said second time delay means, a circuit for the first mentioned time delay means, a switch in the last mentioned circuit, means for closing the last mentioned switch at a predetermined point in the stroke of said one mold member, and means for establishing a holding circuit around the last mentioned switch.

4. In a press for molding plastic materials; two mold members; a stall torque motor and a crank mechanism driven by said motor, said mechanism being adapted to impart a stroke movement to one of said members for moving said one member into and out of cooperating relation with the other of said members; and means for controlling said motor including, a direction control circuit, which when energized causes movement of said motor in one diretcion, a second direction control circuit, which when energized causes movement of said motor in an opposite direction, a switch in the first mentioned circuit, electrically operated time delay means for opening said switch after a period after said time delay means is energized and for closing said switch upon deenergization of said time delay means, a pair of switches in said second direction control circuit, one of said switches being closed by said time delay means after the latter is energized, a second electrically operated time delay means for opening the other of said pair of switches following a period after said second time delay means is energized, a circuit for establishing the first mentioned direction control circuit around the first mentioned switch, a switch in the last mentioned circuit, the last mentioned switch being closed and opened following said period after energization and upon deenergization, respectively, of said second time delay means, a circuit for the first mentioned time delay means, a switch in the last mentioned circuit, means for closing the last mentioned switch at a predetermined point in the stroke of said one mold member, means for establishing a holding circuit around the last mentioned switch, a limit switch in the first mentioned direction control circuit, said limit switch being opened at the end of said stroke in which said mold members are in cooperating relation, a holding circuit for establishing said one direction control circuit about said limit switch, the last mentioned holding circuit including a switch, a third electrically operated time delay means for opening the last mentioned switch following a period after energization thereof, and means for energizing said third time delay means substantially at said end of said stroke.

MEREDITH R. HATCH.
WILLIAM B. SAUL.
HARRY V. O'CONNOR.

REFERENCES CITED

The following references are of record in the file of this patent:

UNITED STATES PATENTS

| Number | Name | Date |
|---|---|---|
| 2,029,026 | Kaula | Jan. 28, 1936 |
| 2,242,189 | Zelov et al. | May 13, 1941 |
| 1,979,246 | Bast | Nov. 6, 1934 |
| 2,160,805 | Winegar | June 6, 1939 |
| 2,269,388 | Weida | Jan. 6, 1942 |
| 1,822,800 | Cone | Sept. 8, 1931 |
| 1,273,265 | Morgan | July 23, 1918 |
| 1,993,413 | Mellon | Mar. 5, 1935 |
| 2,092,092 | Sinclair et al. | Sept. 7, 1937 |
| 2,348,197 | Ernst et al. | May 9, 1944 |